United States Patent [19]

Nukiyama

[11] Patent Number: 4,926,312
[45] Date of Patent: May 15, 1990

[54] PROGRAM SKIP OPERATION CONTROL SYSTEM

[75] Inventor: Tomoji Nukiyama, Tokyo, Japan
[73] Assignee: NEC Corporation, Tokyo, Japan
[21] Appl. No.: 253,442
[22] Filed: Oct. 6, 1988

Related U.S. Application Data

[63] Continuation of Ser. No. 947,243, Dec. 29, 1986, abandoned.

[30] Foreign Application Priority Data

Dec. 25, 1985 [JP] Japan .................. 60-294282

[51] Int. Cl.$^5$ ............................ G06F 9/38; G06F 9/32
[52] U.S. Cl. ............................ 364/200; 364/263.1; 364/261.3; 364/261.7; 364/261.8
[58] Field of Search ... 364/200 MS File, 900 MS File

[56] References Cited

U.S. PATENT DOCUMENTS

| | | | |
|---|---|---|---|
| 4,279,016 | 7/1981 | Leininger et al. | 364/200 |
| 4,471,433 | 9/1984 | Matsumoto et al. | 364/200 |
| 4,566,063 | 1/1986 | Zolnowsky et al. | 364/200 |
| 4,591,972 | 5/1986 | Guyer et al. | 364/200 |
| 4,709,324 | 11/1987 | Kloker | 364/200 |

Primary Examiner—Eddie P. Chan
Assistant Examiner—Christina M. Eakman
Attorney, Agent, or Firm—Foley & Lardner, Schwartz, Jeffery, Schwaab, Mack, Blumenthal & Evans

[57] ABSTRACT

A program skip operation control system used in a prefetched processor includes at least a program memory for storing a number of instructions, an instruction register associated to the program memory to fetch an instruction to be executed, and an instruction decoder receiving the content of the instruction register so as to generate a decoded instruction. An instruction address register is associated to the program memory to updateably prefetch an address of an instruction to be next fetched from the program memory to the instruction register, so that in the course of execution of the decoded instruction outputted from the instruction decoder, an instruction to be next executed is fetched from the program memory to the instruction register. The instruction decoder responds to a skip signal so as to invalidate the decoded instruction and generate a no-operation instruction for at least one cycle after a predetermined skip operation has been carried out.

3 Claims, 2 Drawing Sheets

PROGRAM SKIP OPERATION CONTROL SYSTEM

This application is a continuation of application Ser. No. 947,243, filed December 29, 1986, now abandoned.

BACKGROUND OF THE INVENTION

1. Field of the Invention

The present invention relates to a program controlled processor, and more particularly to a program skip operation control system used in a program controlled processor. More specifically, the present invention relates to a program skip operation control system used in a program controlled processor of the instruction prefetch type which includes a program memory and an instruction address register adapted to hold the address of an instruction to be fetched from the program memory, the instruction address register being capable of updating the address of an instruction so that during execution of one instruction the instruction to be next executed is fetched from the program memory.

2. Description of Related Art

A so-called instruction prefetch type microprocessor has been known as one of the program controlled processors. This instruction prefetch type microprocessor is designed so that each microinstruction is executed in one or two cycles. For this purpose, when each microinstruction is executed, a microinstruction to be executed next after the microinstruction being executed is fetched from a program memory. To ensure such an operation, an address register associated to the program memory is adapted to updateably prefetch an address of an instruction to be next fetched from the program memory.

In this instruction prefetch type microprocessor, branch operations are often required, similarly to other processors. To process such branch operations, the following two methods have been proposed. One of these methods is to break an address already prefetched in an address register as the address of an instruction to be next executed and to newly register a branch address. The other method is to execute an instruction of an address prefetched and then to enter a branch operation. The latter method is called a "delayed branch" hereinafter.

In order to carry out the former method, when a branch operation is conditionally or unconditionally established as the result of microinstruction decoding, it is necessary to invalidate the execution of instructions for the period in which the content of the address register already prefetched is rewritten to a branch address. This will lead to a decrease in the execution efficiency of a program including a number of branch instructions. In the delayed branch system, on the other hand, after a branch operation is established, an instruction of the address already prefetched is executed. Therefore, a program flow becomes complicated at some degree, but the branch operation itself will not directly decrease the processing efficiency.

On the other hand, a program sequence control is generally based either on a first method in which a program address is contained in a microinstruction code without exception, or on a second method in which addresses of microinstructions are controlled by an address generating circuit such as an address counter and an incrementer unless a branch is required, and only branch addresses are included in microinstructions.

Comparing the two methods, the latter method is advantageous in a required capacity of a microinstruction storage memory.

In an instruction prefetch type microprocessor using the delayed branch system and carrying out the program sequence control with a program counter, when a program skip is performed, the following difficulty has been encountered. Namely, when a program skip condition is established, the processing of the next instruction address already prefetched will be attended with a problem similar to that in the branch processing as mentioned above. In addition, a very complicated interaction will be inevitably required between a modification of a program sequence control line and the content of a microinstruction being currently executed, particularly between the execution of the branched microinstruction and the skip operation. Therefore, a program has been subjected to various and many limitation, or a complicated control mechanism has been required. In fact, however, the program skip operation is very frequently combined with the branch operation.

In this circumstance, Japanese Post-examination Patent Publication No. 18738/1984 filed in the name of International Business Machine Corporation, claiming Convention priority based on U.S. patent application Ser. No. 50888 filed June 21, 1979 now U.S. Pat. No. 4,279,016, discloses a branch and interrupt system for a prefetched microprocessor. Specifically, a control of the delayed branch processing and interrupt has been proposed. However, the proposed system still includes such limitations in program and function that it is not allowable to program a branch command after another branch instruction of a program sequence width and that an interrupt operation is limited during execution of the branched command. Therefore, such a general structure is adopted that a program skip operation is carried out by means of internal interrupt. In other words, the proposed system still needs substantial limitation in program or a complicated control for processing a branch command.

SUMMARY OF THE INVENTION

Accordingly, it is an object of the present invention to resolve the above mentioned drawbacks in the conventional prefetched processor of the delayed branch type.

Another object of the present invention is to provide a method of controlling a skip operation without causing substantial limitation to a program and without requiring a complicated control mechanism.

Still another object of the present invention is to provide a program skip operation control system for a prefetched processor of the delayed branch type, which system has overcome the defects of the conventional ones.

A further object of the present invention is to provide such a program skip operation control system which can carry out a skip program without modification of a program sequence control system and without requiring controls of a microinstruction memory, an address generating circuit associated thereto and a prefetch address register.

A still further object of the present invention is to provide a program sequence control system allowing to enter an interrupt operation during execution of the branched command.

The above and other objects of the present invention are achieved in accordance with the present invention by a method of controlling a program skip operation in a prefetched processor which includes at least a program memory for storing a number of instructions, an instruction register associated to the program memory to fetch an instruction to be executed, an instruction decoder receiving the content of the instruction register so as to generate a decoded instruction, and an instruction address register associated to the program memory to updateably prefetch an address of an instruction to be next fetched from the program memory to the instruction register, so that in the course of execution of the decoded instruction outputted from the instruction decoder, an instruction to be next executed is fetched from the program memory to the instruction register, the improvement comprising inhibiting execution of the decoded instruction for at least one cycle after a predetermined skip operation has been carried out.

According to another aspect of the present invention, there is provided a program skip operation control system used in a prefetched processor which includes at least a program memory for storing a number of instructions, an instruction register associated to the program memory to fetch an instruction to be executed, an instruction decoder receiving the content of the instruction register so as to generate a decoded instruction, and an instruction address register associated to the program memory to updateably prefetch an address of an instruction to be next fetched from the program memory to the instruction register, so that in the course of execution of the decoded instruction outputted from the instruction decoder, an instruction to be next executed is fetched from the program memory to the instruction register, wherein the improvement comprises means for invalidating the decoded instruction and generating a no-operation instruction for at least one cycle after a predetermined skip operation has been carried out.

With the above mentioned arrangement, a skip operation can be controlled simply by invalidating a microinstruction to be executed, without executing a processing similar to an operation such as a branch and an interrupt which are inevitably attended with a modification of a program control system, and without additional specific control mechanism. In other words, a prefetched processor can perform a skip operation without substantially decreasing the processing efficiency.

In one embodiment, the instruction decoder is adapted to modify the decoded instruction to the no-operation instruction when the predetermined skip operation has been executed. In another embodiment, the instruction register is adapted to generate the no-operation instruction when the predetermined skip operation has been executed.

The above and other objects, features and advantages of the present invention will be apparent from the following description of preferred embodiments of the invention with reference to the accompanying drawings.

DESCRIPTION OF THE PREFERRED EMBODIMENT

Figure 1:
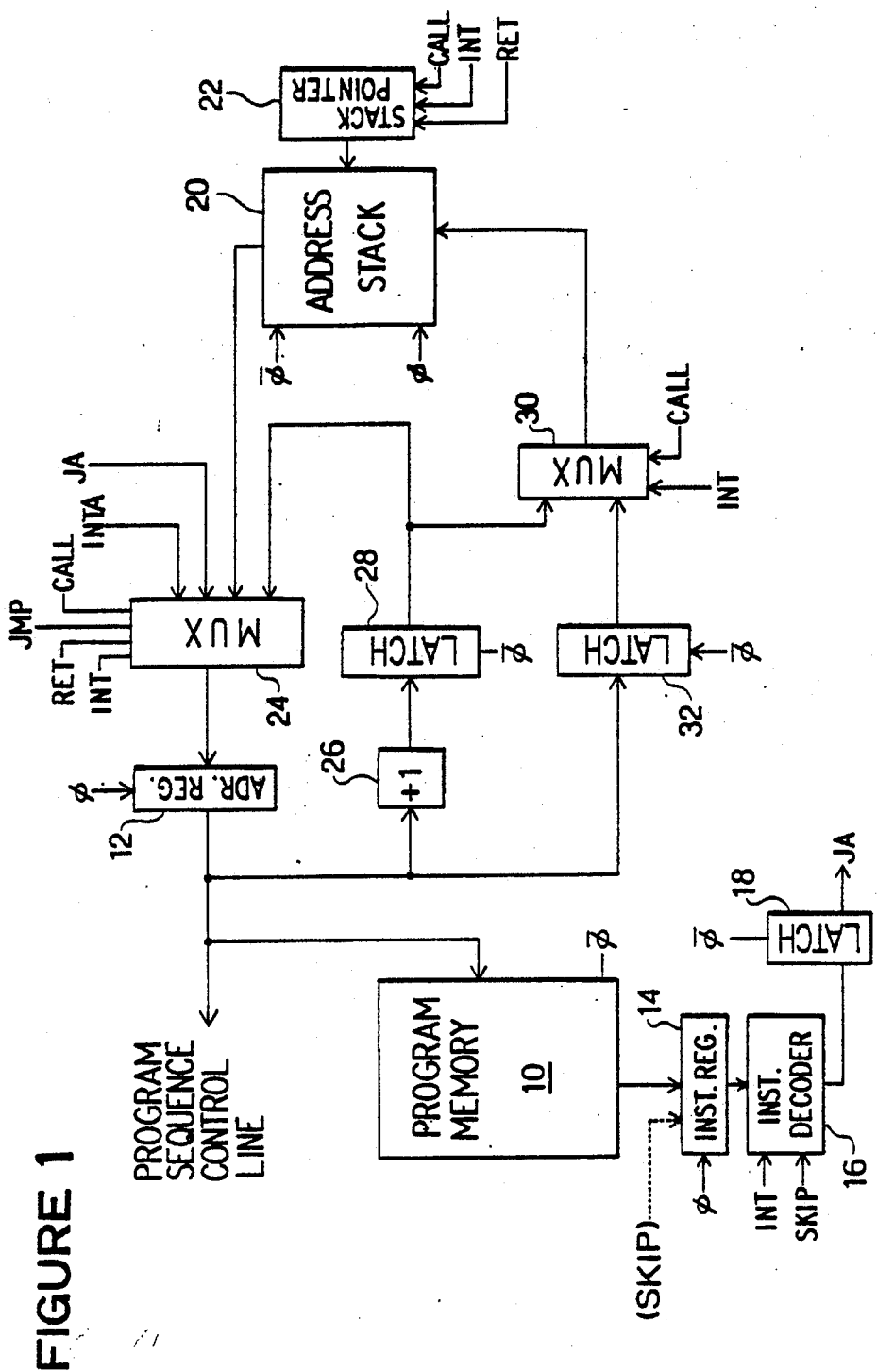
FIG. 1 is a block diagram of a program sequence control unit which embodies the program skip operation control system in accordance with the present invention.

Referring to FIG. 1, there is shown one embodiment of the program sequence control unit for the instruction prefetch type microprocessor. The shown unit comprises a program memory 10 which is ordinarily provided in a conventional central processing unit for storing a number of microinstructions. This program memory 10 is adapted so that a microinstruction of an address designated by an associated address register 12 is made readable in synchronism with a clock $\bar{\phi}$. The microinstruction thus being readable is fetched in an instruction register 14 in synchronism with a clock $\phi$ in opposite phase to the clock $\bar{\phi}$. The microinstruction held in the register 14 is fed to an instruction decoder 16. This decoder in turn outputs a decoded instruction to a latch register 18, where it is latched at the timing of the clock $\bar{\phi}$. The decoder 16 is controlled by an interrupt signal INT and a skip signal SKIP so that when it receives either of these control signals, the decoding operation is invalidated.

The shown control unit also includes an address stack 20, which can be a portion of a stack register provided in a conventional central processing unit. The address stack 20 is adapted to operate in response to the clocks $\phi$ and $\bar{\phi}$ and to output an address data of a location indicated by an associated stack pointer 22, which is in turn controlled by a call signal CALL, the interrupt signal INT and a return signal RET. The address read out from the address stack 20 is transferred through a multiplexor 24 to the address register 12. The multiplexor 24 also receives as input signals the interrupt address INTA and a jump address JA, and is controlled by the interrupt signal INT, the return signal RET, a jump signal JMP, and the call signal CALL.

Further, the content of the address register 12 is supplied through an incrementer 26 to a latch register 28 operated in sychronism with the clock $\bar{\phi}$. The incremented address latched in the latch register 28 is also supplied to the multiplexor 24 and one input of another multiplexor 30. This multiplexor 30 is connected at its other input to a latch register 32 which is adapted to latch the content of the address register 12 in synchronism with the clock $\bar{\phi}$.

Next, operation of the above mentioned program sequence control unit will be explained with reference to the timing charts shown in FIGS. 2A to 2D illustrating a train of synchronous clocks $\phi$ and a relation between the clocks $\phi$, addresses and microinstruction codes. As seen from FIGS. 2A to 2D, each microinstruction is executed in one cycle of the clock $\phi$, and each address is also prefetched in one cycle of the clock $\phi$.

Figure 2A:
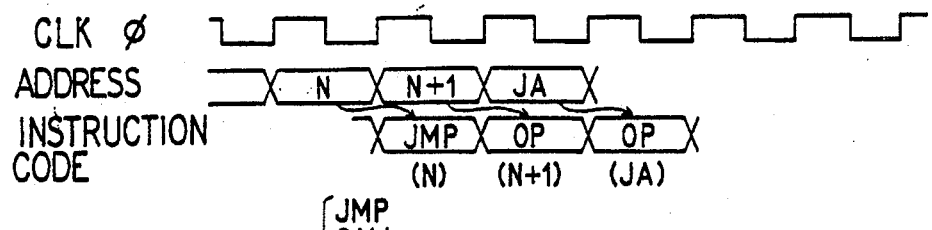
FIGS. 2A to 2D are timing charts illustrating various operation modes of the system shown in FIG. 1.

In an example shown in FIG. 2A, a jump instruction is programmed at the address N (instead of the jump instruction, a call instruction or a return instruction can be programmed). The address N is prefetched through the multiplexor 24 to the address register 12, and then, the microinstruction code of the address N in the program memory 10 is fetched in the instruction register 14 after one cycle. This instruction code is decoded in the instruction decoder 16, and a jump address JA included in the microinstruction code is latched in the latch register 18, and then registered to the address register 12 through the multiplexor 24 controlled to select the jump address JA in accordance with the jump signal JMP.

However, the jump address JA is actually fetched in the address register 12 after one instruction cycle from when the microinstruction code of the address N is fetched in the instruction register 14. The reason for this is as follows: When the address N prefetched in the address register 12 is supplied not only to the program memory 10 but also to the incrementer 26, the incremented address, i.e., the address N+1 is latched to the latch register 28 in synchronism with the clock $\bar{\phi}$, i.e., when the instruction of the address N is put readable from the program memory. Thereafter, when the instruction register 14 registers the microinstruction code of the address N in synchronism with the clock $\phi$ and the decoder 16 outputs the decoded instructions, the address N+1 in the register 28 is registered in the address register 12 through the multiplexor 24. Accordingly, when the jump address JA is latched in the register 18 in response to the clock $\bar{\phi}$, the address N+1 is already prefetched in the address register 12, and the program memory 10 is put in a condition capable of reading the address N+1. When the microinstruction code of the address N+1 is registered in the instruction register 14 in response to the clock $\phi$ so that the microinstruction code of the address N+1 is decoded in the decoder 16, the jump address JA is actually registered in the address register 12 through the multiplexor 24 which is controlled in accordance with the jump signal JMP so as to select the jump address JA. Then, when the microinstruction code of the address N+1 decoded in the decoder 16 is executed, the program memory 10 is put in a condition capable of reading out an instruction of the jump address JA. Thereafter, the microinstruction of the jump address JA is registered in the instruction register 14, and is decoded by the decoder 16 for execution of the microinstruction. Thus, the branch operation is executed after one instruction cycle delay. In other words, the shown unit is of the delayed branch system. In addition, the shown unit is such that unless the branch operation is required the microinstruction address is controlled by the incrementer 26. Further, a branch instruction at address N is executed without programming a branch instruction code at address N+1 and by programming thereat an instruction other than a branch instruction, so that a decrease in processing efficiency caused by the branch operation is prevented.

A conditional jump, an unconditional jump, a call and a return are carried out similarly to the above mentioned operation. But, in the case of the call and the return, the address stack 20 is operated. For example, when the instruction of the address N is a call instruction, after the execution of the instruction of the address N+1, the program is branched to the jump address JA, and at the same time, a return address N+2, generated by the incrementer 26 which receives the address N+1 from the address register 12 at that time, is latched in the latch 28 in response to the clock $\bar{\phi}$ and then supplied to the address stack 20 through the multiplexor 30 controlled to select the output of the latch 28 in accordance with the call signal CALL. The return address N+2 is held in the address stack 20 in response to the clock $\phi$ under control of the stack pointer 22 which receives the call signal CALL. Similarly, in the case of a return instruction, after the execution of the return instruction, the next instruction is executed. On the other hand, the return address is read out from the address stack 20 in response to the clock $\phi$ under the control of the stack pointer 22 receiving the return signal RET, and the return address so read out is loaded to the address register 12 through the multiplexor 24 controlled to select the output of the address stack 20 in accordance with the return signal RET.

Figure 2B:
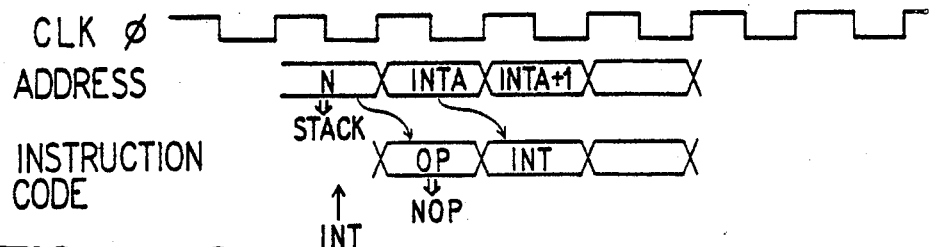

FIG. 2B illustrates an example of an interrupt processing. For example, if an interrupt is generated when the address N is prefetched, the address N prefetched in the address register is latched in the register 32 at the clock $\bar{\phi}$ and supplied through the multiplexor 30 which is controlled to select the output of the register 32 in accordance with the interrupt signal INT. Then, the address N is saved in the address stack 20 in response to the clock $\phi$ under control of the stack pointer 22 receiving the interrupt signal INT. On the other hand, the instruction code of the address N fetched in the instruction register 14 after one instruction cycle is modified to a no-operation instruction in the decoder controlled under the interrupt signal INT. Further, an interrupt address INTA is loaded to the address register 12 through the multiplexor controlled to select the interrupt address INTA in accordance with the interrupt signal INT. Thus, the interrupt operation is carried out.

Figure 2C:
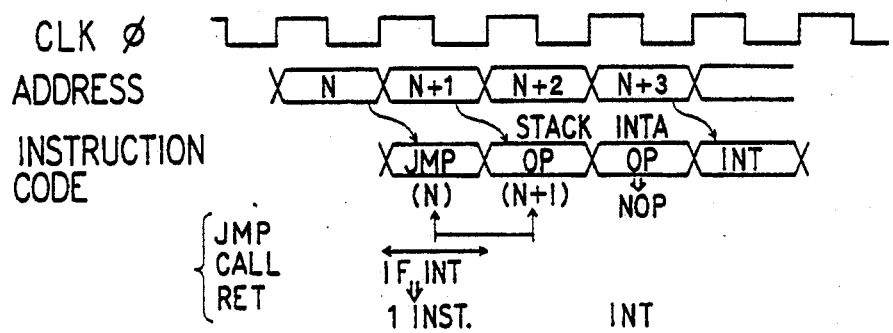

FIG. 2C shows the case that an interrupt is requested when the branch operation is executed. In this case, when the multiplexor 24 receives the jump signal JMP, it does not respond to the interrupt signal INT, so that the interrupt address INTA is registered to the address register 12. Thus, the interrupt is masked when the branch instruction of the address N is being executed, and after the branch has been completed, i.e., when the instruction of the address N+1 is to be executed, the interrupt is allowed. Thereafter, the operation is carried out similarly to the case of interrupt explained with reference to FIG. 2B.

Figure 2D:
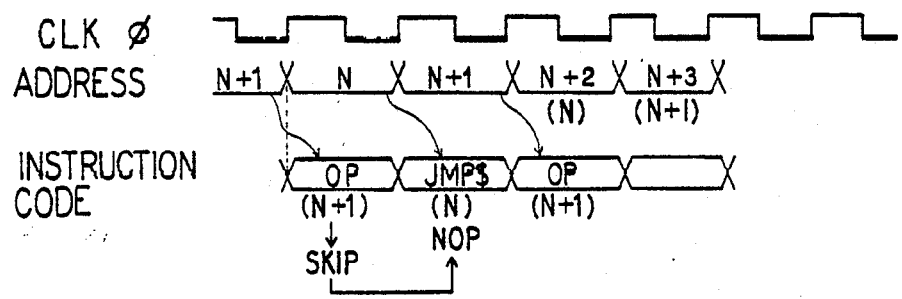

FIG. 2D illustrates a skip operation in the case that the address N is programmed with a JMP instruction requesting the jump to the same address, i.e., to the address N.

As mentioned above, since the system is of the delayed branch type, such an operation would be repeated so that after an instruction of the address N+1 next to the address N is executed, the program is jumped to the address N. Namely, the instructions of the addresses N and N+1 would be repeatedly executed.

In this case, even if the address N+1 stores a command such as a condition of skip (for example a time counter operation instruction) other than the branch instructions so that when the skip condition is established the next occuring address is modified, since the address N is prefetched and the jump command is executed, the processor cannot get out of the loop defined by the addresses N and N+1.

In this embodiment, however, the instruction decoder 16 is controlled in accordance with the skip signal SKIP to modify the instruction from the instruction register 14 to a no-operation instruction. Thus, as seen from FIG. 2D, after the skip operation is executed, when the JMP instruction of the address N is again loaded to the decoder 16, the JMP instruction is modified to a no-operation instruction. As a result, the sequence is changed so that the address N+2 succeeds the address N+1. Thus, the skip operation can be controlled (terminated) without modifying or controlling the address system.

As seen from the above, the program skip operation of the prefetched microprocessor is not carried out by an internal interrupt. Rather the program skip operation is simply controlled by controlling the instruction decoder without modifying or controlling the program sequence control unit. Thus, the processor can process the skip operation with a very simple construction at a high efficiency.

In the above mentioned embodiment, the decoder 16 is controlled to modify the skip instruction to a no-operation instruction. But, as shown by the dotted line in FIG. 1, the instruction register 14 can be adapted to respond to the skip signal SKIP so as to output a no-operation instruction in place of the fetched instruction.

The invention has thus been shown and described with reference to the specific embodiments. However, it should be noted that the invention is in no way limited to the details of the illustrated structures but changes and modifications may be made within the scope of the appended claims.

I claim:

1. A processor of the delayed branch type comprising:
   an address register for fetching and outputting an address supplied thereto in response to a first clock having a first phase;
   a program memory storing a number of instructions and coupled to said address register, said program memory reading out an instruction at an address indicated by said address register in response to a second clock having a second phase different from said first phase of said first clock;
   an instruction register coupled to said program memory for fetching and outputting said read out instruction from said program memory in response to said first clock;
   a decoder coupled to said instruction register for decoding said instruction from said instruction register and generating a decoded output, said decoder further generating a jump destination address when said decoder decodes a jump instruction;
   a first latch coupled to said decoder for latching said jump destination address;
   a second latch for latching an address obtained by incrementing said address outputted from said address register; and
   a multiplexor coupled to said first and second latches for selecting one of said addresses from said first and second latches and supplying said selected address to said address register, said multiplexor selecting said address from said first latch when a jump signal is supplied thereto and selecting said address from said second latch when said jump signal is not supplied thereto;
   said program memory storing a jump instruction at a first address and a skip conditional discrimination instruction at a second address next to said first address,
   whereby, in the course of the execution of said jump instruction, said skip conditional discrimination instruction is executed before said jump destination address is fetched in said address register, and said decoder receives a skip signal if a skip condition is fulfilled as the result of the execution of said skip conditional discrimination instruction so that said decoder generates a no-operation instruction code even if said decoder receives said jump instruction, and whereby said jump signal is not supplied to said multiplexor with the result that a sequence advances an instruction next to said skip conditional discrimination instruction.

2. An apparatus for controlling a program skip operation in a prefetched processor of a delayed branch type which includes:
   an address register for holding an address,
   a program memory storing a number of instructions and coupled to said address register for reading out an instruction at an address indicated by said address register,
   an instruction register coupled to said program memory for holding said read out instruction from said program memory,
   a decoder coupled to said instruction register for generating a decoded output,
   a first latch coupled to said decoder so as to latch a branch destination address obtained from said decoder when said decoder decodes a branch instruction,
   a second latch coupled to said address register through an incrementer so as to latch an address obtained by incrementing an address outputted from said address register,
   a multiplexor coupled to receive at least said address held in said second latch and an address held in said first latch so as to selectively output one of said received addresses to said address register;
   said prefetched processor operative so that said address register fetches an address outputted from said multiplexor at a first clock and at the same time said instruction register fetches said read out instruction from said program memory and said decoder decodes said instruction held in and supplied from said instruction register for generating said decoded output, and in response to a second clock shifted in phase from said first clock, an instruction designated by said address held in said address register is read out from said program memory in order to be supplied to said instruction register,
   said multiplexor operating to normally supply said address from said second latch to said address register, but operating to supply said branch destination address held in said first latch when a jump instruction is generated as the result of an execution of a branch instruction,
   whereby, in the course of said execution of said branch instruction, an instruction next to said branch instruction is executed before said branch destination address is stored in said address register;
   wherein
   a skip condition discrimination instruction is interposed next to said jump instruction, and
   a skip signal is generated to said decoder if a skip condition is fulfilled as a result of an execution of said skip condition discrimination instruction so that said decoder generates a no-operation instruction code even if said decoder receives the jump instruction, whereby
   a jump signal is not generated with the result that a sequence advances an instruction next to said skip condition discrimination instruction.

3. An apparatus for controlling a program skip operation in a prefetched processor of the delayed branch type which includes:
   an address register for holding an address,
   a program memory storing a number of instructions and coupled to said address register for reading out an instruction at an address indicated by said address register, an instruction register coupled to said program memory for holding said read out instruction from said program memory, a decoder coupled to said instruction register for generating a decoded output, a first latch coupled to said decoder so as to latch a branch destination address obtained from said decoder when said decoder decodes a branch instruction, a second latch coupled to said address register through an incrementer so as to latch an address obtained by incrementing an address outputted from said address register, a third latch coupled to said address register for directly holding said address held in said address register, a first multiplexor coupled to said second and third latches so as to selectively output one of said addresses held in said second and third latches, an address stack coupled to receive an address selectively outputted from said first multiplexor, and a second multiplexor coupled to receive at least an address held in said second latch, an address held in said first latch and an output of said address stack so as to selectively output one of said received addresses to said address register;

said prefetched processor operative so that said address register fetches said address outputted from said second multiplexor at a first clock and at the same time said instruction register fetches said read out instruction from said program memory and said decoder decodes said instruction held in and supplied from said instruction register for generating said decoded output, and in response to a second clock shifted in phase from said first clock, an instruction designated by said address held in said address register is read out from said program memory to be supplied to said instruction register, said second multiplexor operating to normally supply said address from said second latch to said address register and operating to supply said output of said address stack when a return instruction is executed, said second multiplexor also operating to supply said branch destination address held in said first latch when a jump instruction is generated as the result of an execution of a branch instruction, whereby in the course of said execution of said branch instruction, an instruction next to said branch instruction is executed before said branch destination address is stored in said address register;

wherein a skip condition discrimination instruction is interposed next to said jump instruction, and a skip signal is generated to said decoder if a skip condition is fulfilled as a result of an execution of said skip condition discrimination instruction so that said decoder generates a no-operation instruction code even if said decoder receives said jump instruction, whereby a jump signal is not generated with the result that a sequence advances an instruction next to said skip condition discrimination instruction.

* * * * *